United States Patent
Tisch et al.

(10) Patent No.: US 12,520,079 B2
(45) Date of Patent: Jan. 6, 2026

(54) BLOCKED MICROPHONE DETECTOR AND WIND SOCK DETECTOR

(71) Applicant: GoPro, Inc., San Mateo, CA (US)

(72) Inventors: Erich Tisch, San Francisco, CA (US); Timothy Dick, San Francisco, CA (US); Ramesh Avudurthi, Santa Clara, CA (US); Eric Steven Penrod, Brentwood, CA (US)

(73) Assignee: GoPro, Inc., San Mateo, CA (US)

( * ) Notice: Subject to any disclaimer, the term of this patent is extended or adjusted under 35 U.S.C. 154(b) by 270 days.

(21) Appl. No.: 18/218,827

(22) Filed: Jul. 6, 2023

(65) Prior Publication Data

US 2024/0015437 A1  Jan. 11, 2024

Related U.S. Application Data (60) Provisional application No. 63/359,139, filed on Jul. 7, 2022.

(51) Int. Cl.
*H04R 3/04* (2006.01)
*G03B 31/00* (2021.01)
*H04R 29/00* (2006.01)

(52) U.S. Cl.
CPC ............ *H04R 3/04* (2013.01); *H04R 29/004* (2013.01); *G03B 31/00* (2013.01); *G03B 2217/002* (2013.01); *H04R 2410/07* (2013.01); *H04R 2430/03* (2013.01); *H04R 2499/11* (2013.01)

(58) Field of Classification Search
CPC .... H04R 3/04; H04R 29/004; H04R 2410/07; H04R 2430/03; H04R 2499/11; H04R 2430/20; H04R 3/005; H04R 31/00; H04R 2217/002
USPC .............................. 381/91, 92, 122, 359, 365
See application file for complete search history.

(56) References Cited

U.S. PATENT DOCUMENTS

| | | | | |
|---|---|---|---|---|
| 9,350,895 | B1 * | 5/2016 | Beckmann | G10L 21/0264 |
| 11,245,982 | B2 * | 2/2022 | Tisch | H04R 3/005 |
| 11,252,504 | B2 * | 2/2022 | Sapozhnykov | H04R 1/222 |
| 11,689,847 | B2 * | 6/2023 | Tisch | H04S 1/007 |
| | | | | 381/91 |
| 12,153,331 | B2 * | 11/2024 | Tisch | G03B 17/02 |
| 12,323,783 | B2 * | 6/2025 | Chi | H04R 5/027 |
| 2015/0172811 | A1 * | 6/2015 | Sassi | H04M 1/6041 |
| | | | | 381/71.1 |
| 2022/0060821 | A1 * | 2/2022 | Dick | H04S 7/307 |
| 2024/0015433 | A1 * | 1/2024 | Dick | H04R 3/005 |

FOREIGN PATENT DOCUMENTS

GB  2608644 A  *  1/2023  ............. H04R 5/027

* cited by examiner

*Primary Examiner* — Xu Mei
(74) *Attorney, Agent, or Firm* — Young Basile Hanlon & MacFarlane, P.C.

(57) ABSTRACT

An image capture device performs audio processing based on a detection of whether a wind sock is attached to the image capture device. When a wind sock is detected, the image capture device performs stereo processing. When a wind sock is not detected, the image capture device performs wind processing.

20 Claims, 9 Drawing Sheets

BLOCKED MICROPHONE DETECTOR AND WIND SOCK DETECTOR

CROSS-REFERENCE TO RELATED APPLICATION(S)

This application claims priority to and the benefit of U.S. Provisional Application Patent Ser. No. 63/359,139, filed Jul. 7, 2022, the entire disclosure of which is hereby incorporated by reference.

TECHNICAL FIELD

This disclosure relates to audio processing. In particular, this disclosure relates to audio processing and detection of blocked microphones and/or wind socks.

BACKGROUND

Audio processing in image capture devices can be negatively affected by various factors, including blocked microphone ports and wind noise. Image capture devices typically have microphone ports that can be unintentionally blocked by a finger of a user when using the image capture device by hand. A blocked microphone port can interrupt audio processing and disrupt a natural audio experience when audio signals are encoded. In a case of wind noise, wind noise can affect differential microphone arrays when beamforming and can prevent stereo and/or beamforming processing.

SUMMARY

Disclosed herein are implementations of an image capture device configured to detect an attached wind sock. The image capture device includes a microphone, a sensor, and a processor. The microphone may be configured to detect audio signals. The sensor may be configured to detect whether a wind sock is attached to the image capture device. The processor may be configured to perform stereo processing of the audio signals based on a detection of an attached wind sock to obtain processed audio signals. The processor may be configured to perform wind processing based on a non-detection of an attached wind sock to obtain processed audio signals. The processor may be configured to output the processed audio signals.

A method for wind sock detection may include detecting audio signals using one or more microphones of an image capture device. The method may include determining whether a wind sock is attached to the image capture device. The method may include prioritizing stereo processing over wind processing based on a determination that the wind sock is attached. The method may include prioritizing wind processing over stereo processing based on a determination that the wind sock is not attached.

A method for blocked microphone detection may include receiving audio signals from at least two microphones. An algorithm to detect a blocked microphone may be trained using machine learning. The method may include splitting the audio signals into frequency sub-bands. The method may include applying, in each frequency sub-band, an amplitude offset based on a noise floor. The method may include determining, in each frequency sub-band, a first correlation metric between offset audio signals from the at least two microphones. The method may include calculating a second correlation metric from frequency sub-bands below a first threshold frequency. The method may include determining whether the second correlation metric is below a second threshold. The method may include determining that a microphone of the at least two microphones is unblocked based on a determination that the second correlation metric is above the second threshold. The method may include determining that a microphone of the at least two microphones is blocked based on a determination that the second correlation metric is below the second threshold. The method may include transmitting a notification that indicates whether a microphone of the at least two microphones is blocked or unblocked.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Many users of image capture devices do not have an understanding of the positioning of the microphone ports on their image capture devices. Accordingly, these users may be unaware that blocking just one microphone port can negatively affect beamforming used for stereo processing. The users may also be unaware of how to hold the image capture device so that the microphone ports are unblocked. This lack of awareness may be an issue when the user is attempting to hold the image capture device and use it in a vlogging or point-of-view (POV) use case without an attached grip. If the user repositions a hand in the wrong way, the user may accidentally trigger audio processing that is inappropriate for the given scene/scenario. The implementations described herein may provide a visual notification, a haptic notification, an audible notification, or any combination thereof to the user to identify such a condition. For example, an audible alert can be used when the user cannot see a display of the image capture device, such as when the display is oriented away from the user. In this example, the user may receive an audible notification, such as a voice notification or other audible notification that a microphone port is blocked.

Typical audio processing detects the presence of wind and actively switches to a wind processing mode. This wind processing mode actively reduces wind noise recorded by the camera, however, stereo processing is lost. In some situations, vibrations from handling the image capture device can falsely trigger a wind processing event when there is no wind present. The automated switching between wind processing and stereo modes can also be distracting to the user and result in a poor user experience. A wind sock can be used to minimize turbulent noise caused by wind. However, with a wind sock present, the image capture device may still be susceptible to falsely detecting wind when vibration is experienced. The implementations described herein include an image capture device that is configured to detect the presence of a wind sock such that when a wind sock is detected, the image capture device is configured to prioritize stereo processing to avoid false wind detections and unneeded changes to wind processing mode due to handling. In some examples, with a wind sock present, some true detection of wind may occur. In these examples, with the knowledge of an attached wind sock, a different type of wind processing (e.g., other than stereo processing) may be performed.

Figure 1A:
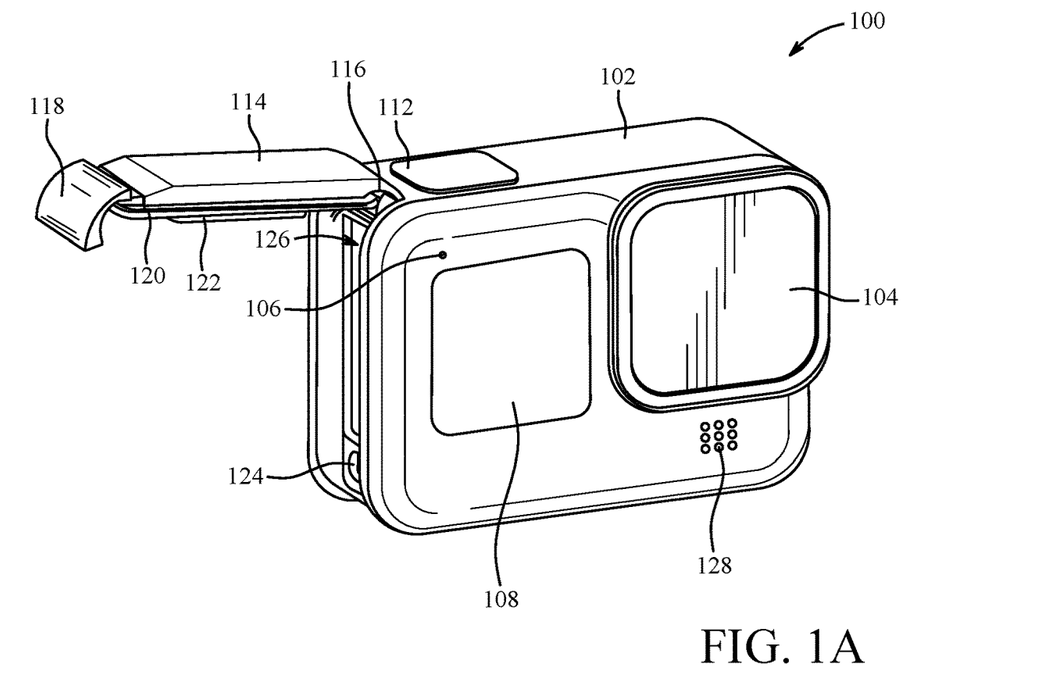
FIGS. 1A-B are isometric views of an example of an image capture device.
Figure 1B:
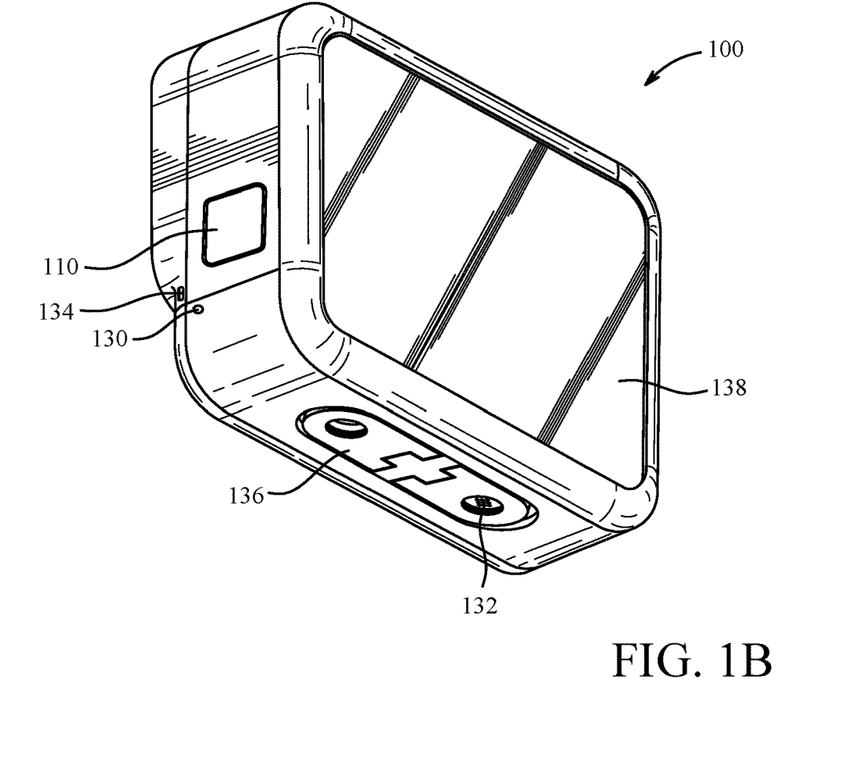

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 5:
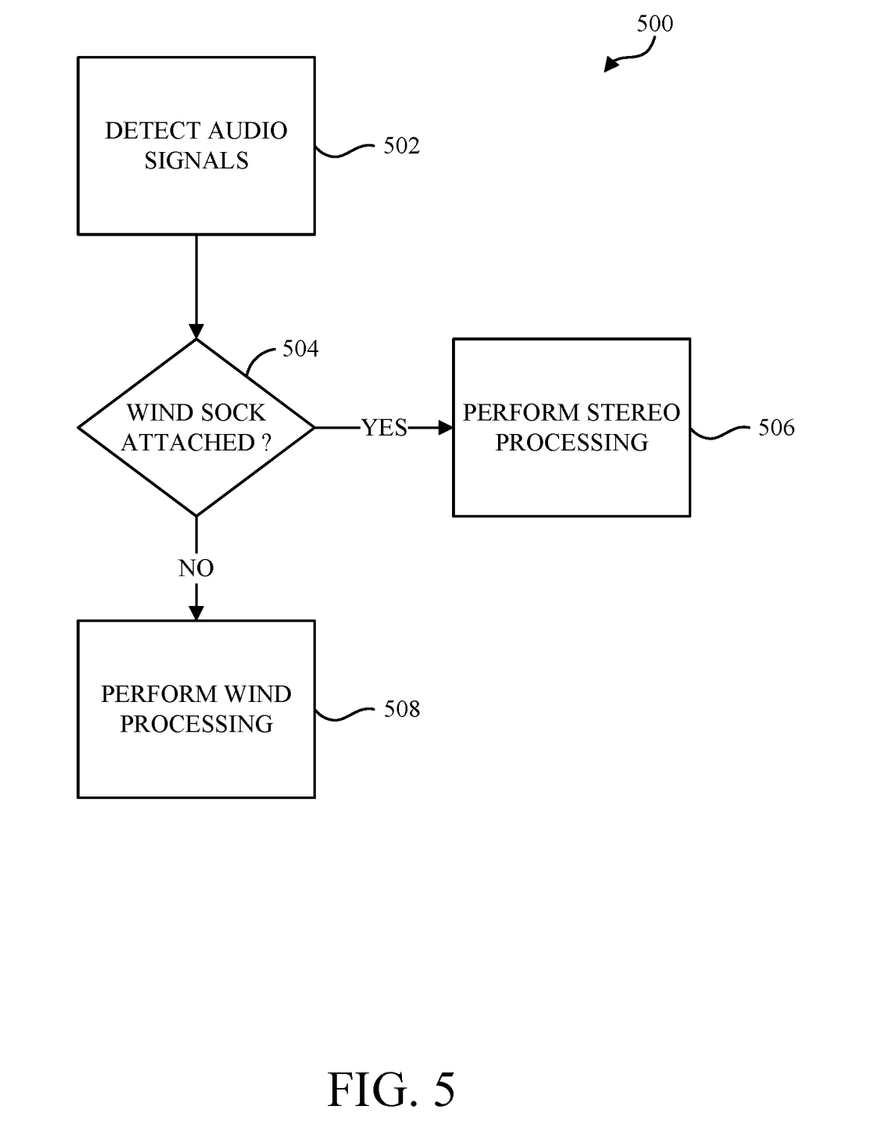
FIG. 5 is a flow diagram of an example of a method for performing audio processing with wind sock detection.
Figure 6:
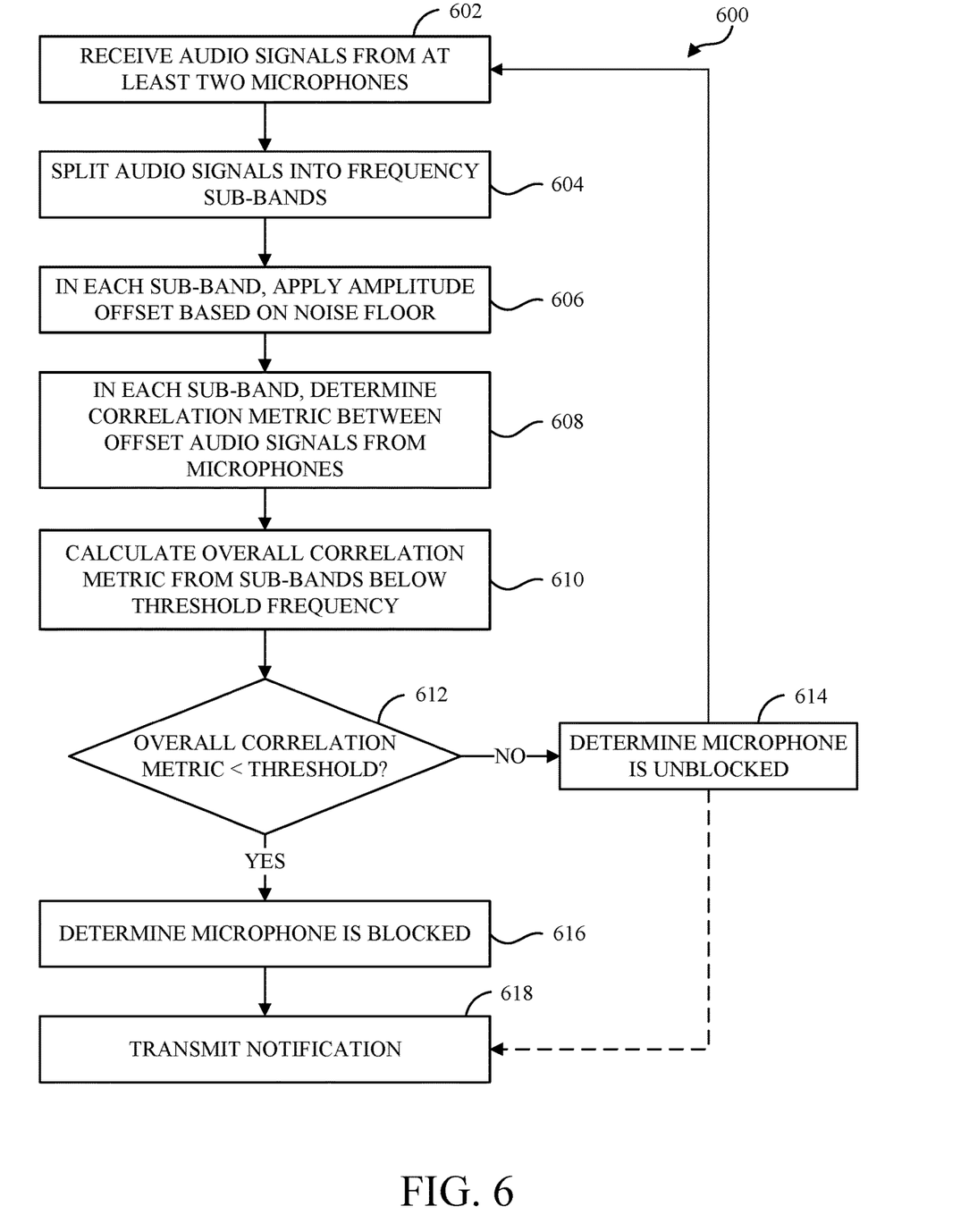
FIG. 6 is a flow diagram of an example of a method for detecting a blocked microphone.

The image capture device 100 may be used to implement some or all of the techniques and methods described in this disclosure, such as the method 500 described in FIG. 5 or the method 600 described in FIG. 6.

Figure 2A:
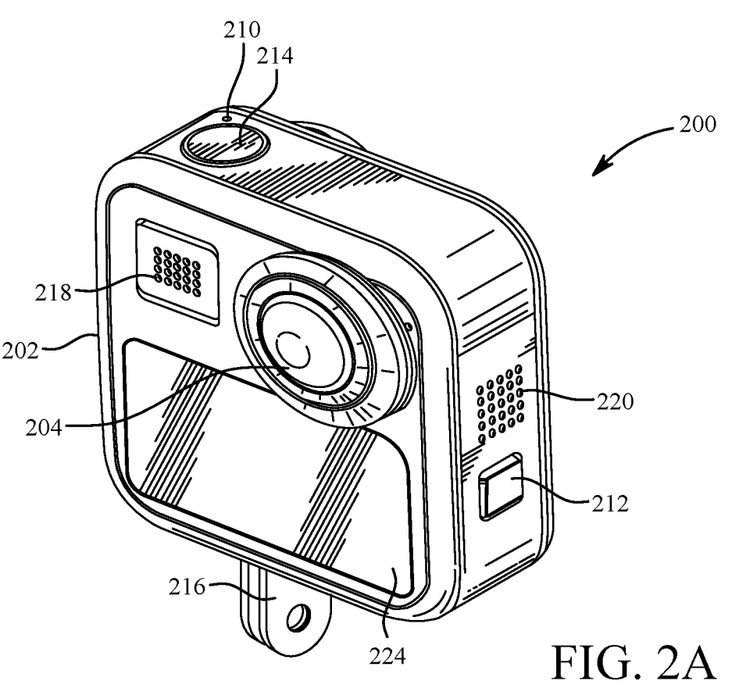
FIGS. 2A-B are isometric views of another example of an image capture device.
Figure 2B:
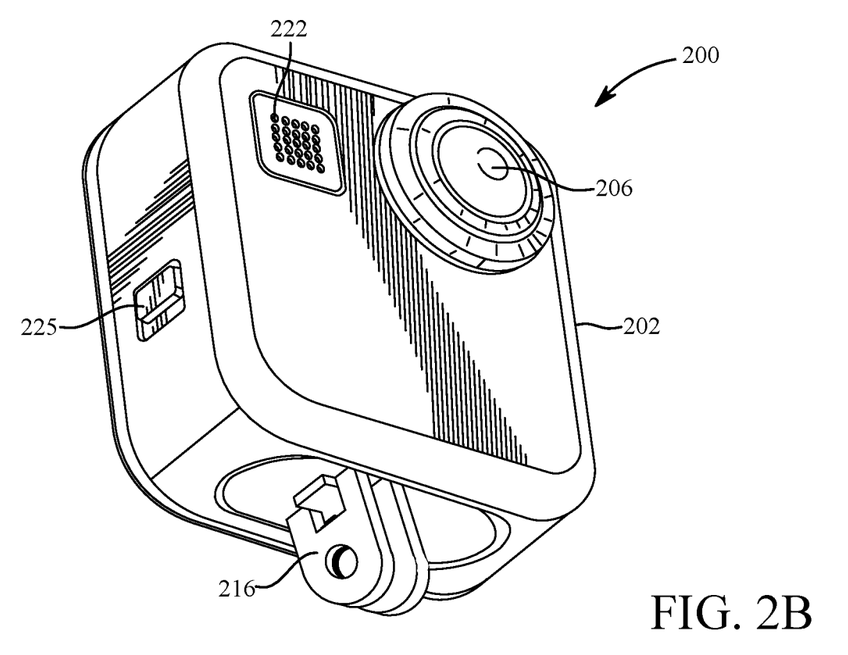

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
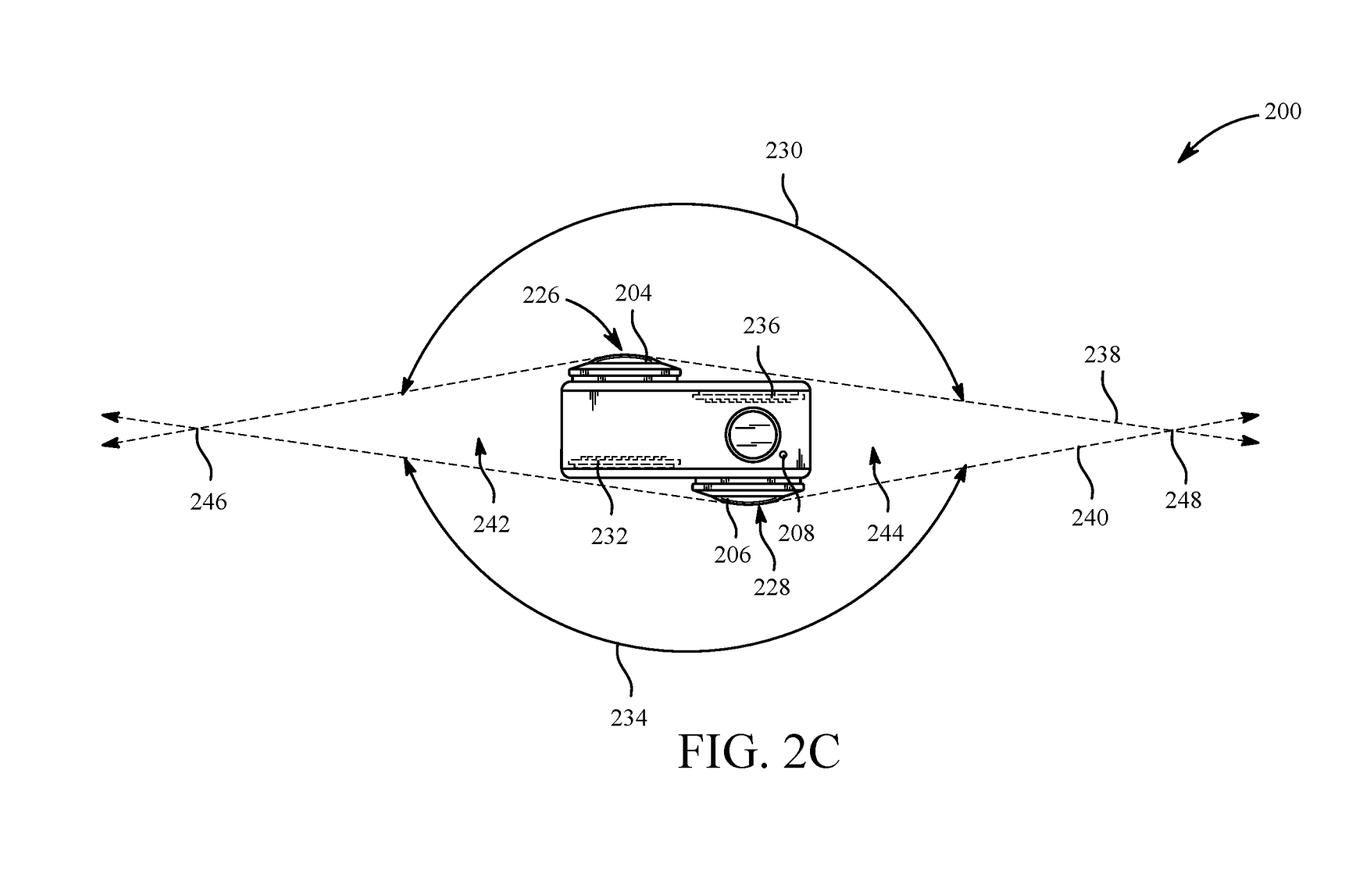
FIG. 2C is a top view of the image capture device of FIGS. 2A-B.
Figure 2D:
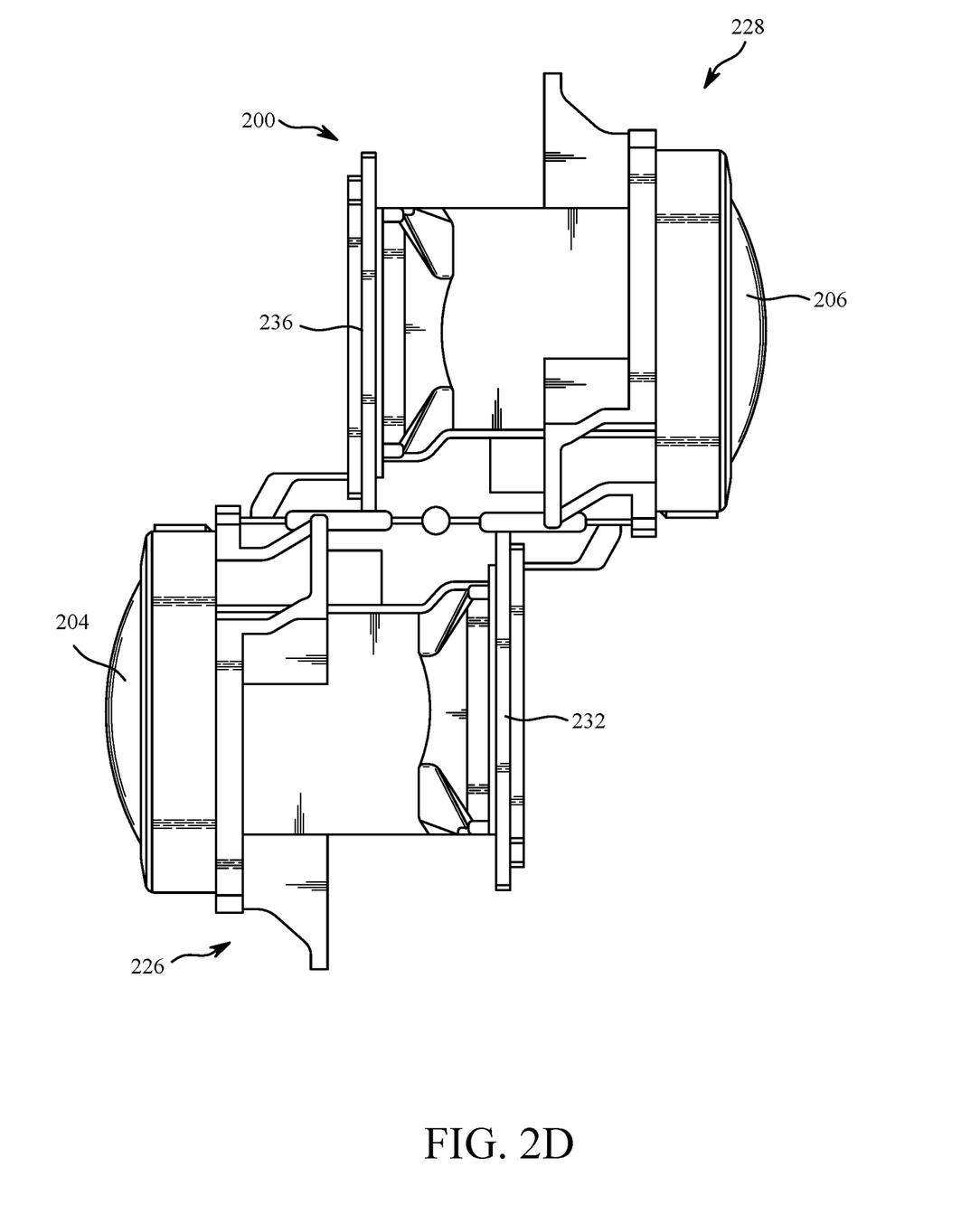
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the techniques and methods described in this disclosure, such as the method 500 described in FIG. 500 or the method 600 described in FIG. 600.

Figure 3:
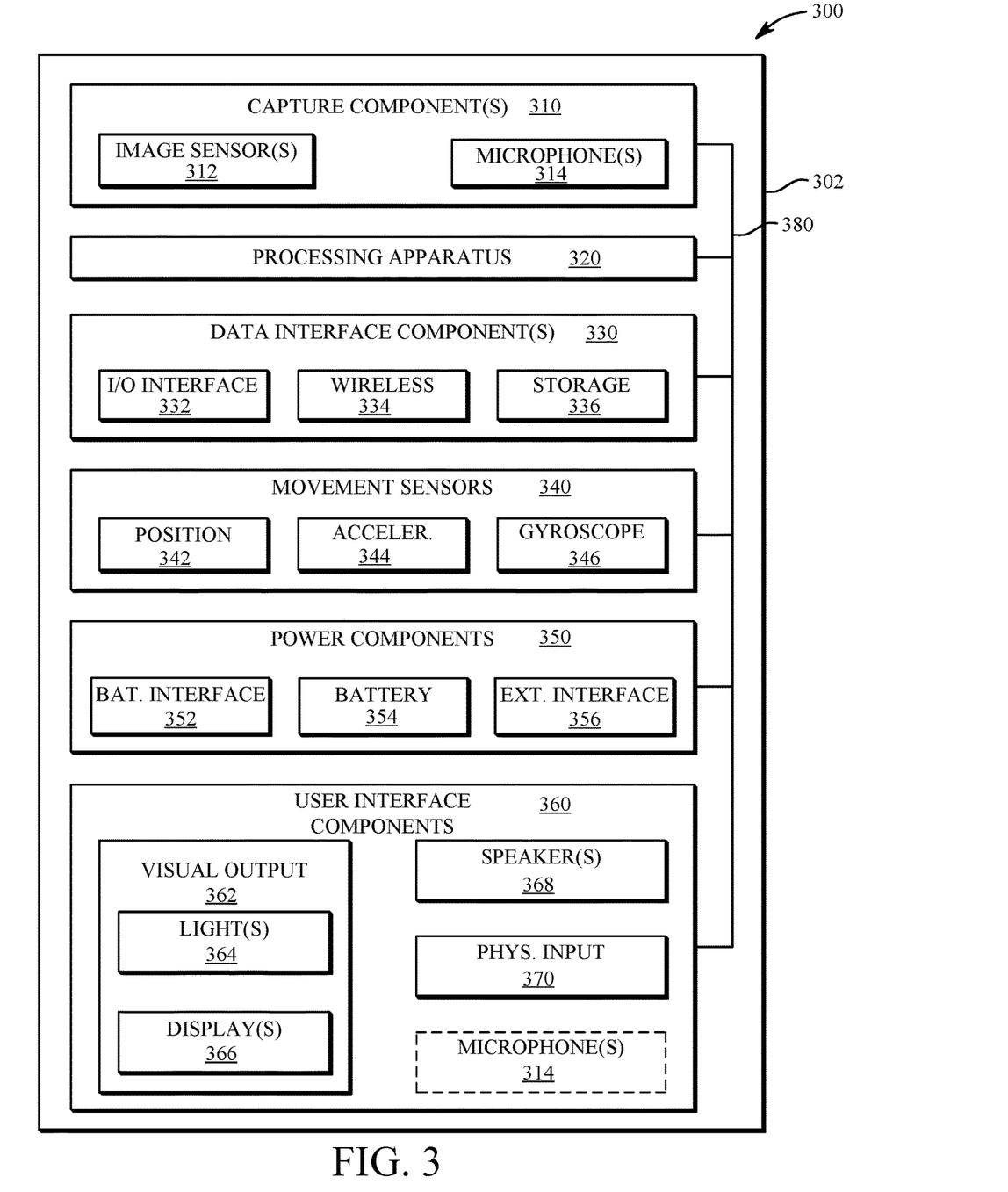
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques and methods described in this disclosure, such as the method 500 described in FIG. 5 or the method 600 described in FIG. 6.

Figure 4:
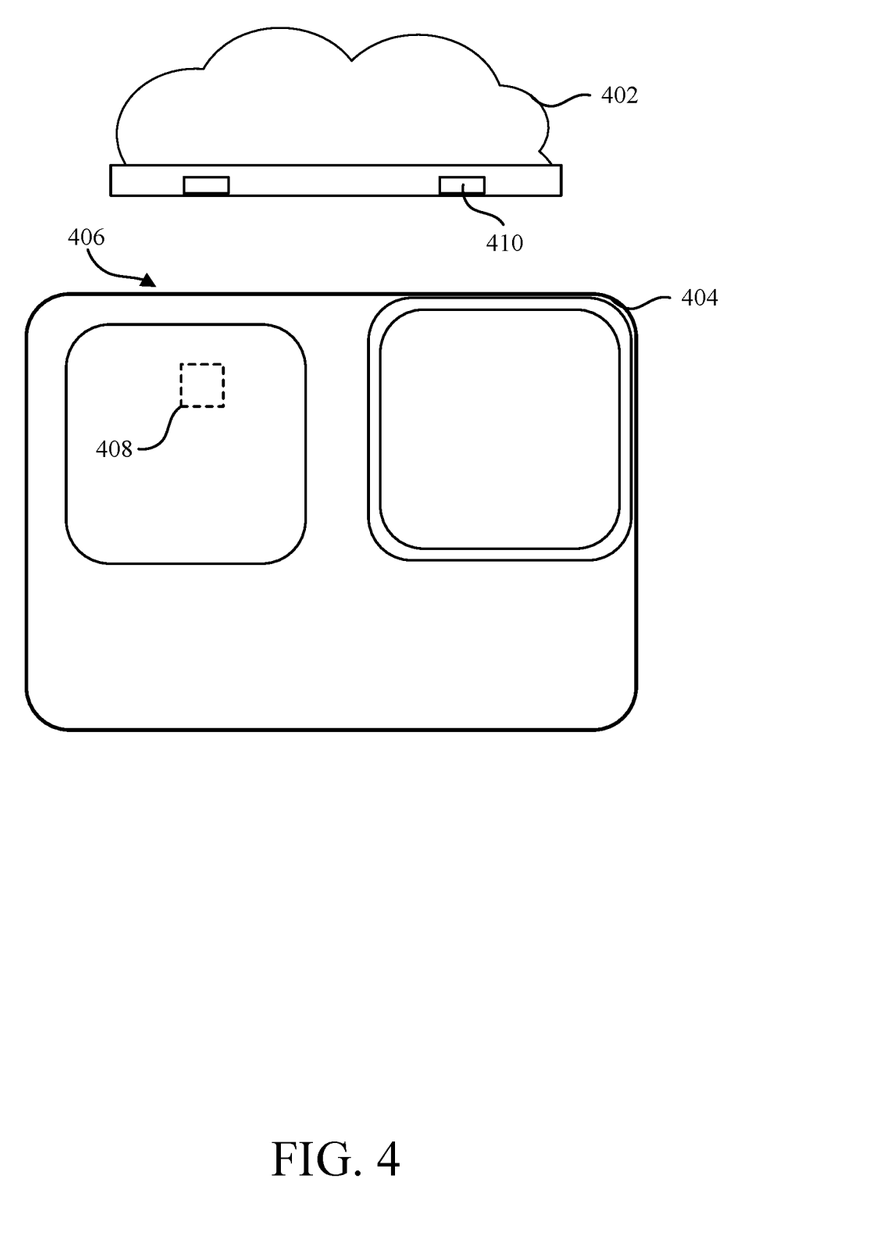
FIG. 4 is a block diagram of an example of a wind sock configured for use with the image capture devices shown in FIGS. 1A to 3.

FIG. 4 is a block diagram of an example of a wind sock 402 configured for use with an image capture device 404. The image capture device 404 may be an image capture device such as the image capture device 300 shown in FIG. 3.

As shown in FIG. 4, the image capture device 404 includes a detection interface 406 and a sensor 408. The detection interface 406 may include an interface for magnetic detection, switch detection, photo sensor detection, or another detection interface. The sensor 408 may include a hall effect sensor, a switch, a photo sensor, or another sensor. The sensor 408 is configured to detect the presence of the wind sock 402. The sensor 408 may transmit an indication of the presence of the wind sock 402 to a processor, such as processing apparatus 320 shown in FIG. 3.

The wind sock 402 includes one or more magnets 410. The one or more magnets 410 are configured to attach the wind sock 402 to the detection interface 406 of the image capture device 404. In some embodiments, a magnet of the one or more magnets 410 may be replaced with an actuator that is configured to activate a switch on the detection interface 406 of the image capture device 404. The sensor 408 is configured to detect when the wind sock 402 is attached and transmit an indication of the presence of the wind sock 402 to the processor. The processor is configured to receive the indication of the presence of the wind sock 402 and prioritize beamforming processing over wind processing. Accordingly, the processor is configured to perform beamforming processing in response to receiving an indication of the presence of the wind sock 402. Though described as using one or more magnets 410 to couple the wind sock 402 and the image capture device 404, other mechanical connection mechanisms, such as hooks, latches, detents, clips, slots, etc. may be used to couple the wind sock 402 and the image capture device 404.

FIG. 5 is a flow diagram of an example of a method 500 for performing audio processing with wind sock detection. The method 500 may be performed by an image capture device, such as the image capture device 404 shown in FIG. 4.

The method 500 includes detecting 502 audio signals. The audio signals may be detected 502 using one or more microphones, such as the one or more microphones 314 shown in FIG. 3.

The method 500 includes determining 504 whether a wind sock is attached to the image capture device. The determination of whether a wind sock is attached may be based on sensor data. The sensor data may include an indication of whether the wind sock is attached to the image capture device. The sensor data may include data associated with a magnetic sensor (e.g., a hall effect sensor), data associated with a switch, data associated with a photo sensor, or data associated with another sensor.

Based on a determination that a wind sock is attached, the method 500 includes performing 506 stereo processing or another processing. The method may prioritize stereo processing or another processing over wind processing based on the determination that the wind sock is attached. The other processing may include, for example, deactivating water detection to save processing power since a wind sock is not used in water use cases, or applying an alternate calibration for the microphones with the wind sock attached. Based on a determination that the wind sock is not attached, the method 500 includes performing 508 wind processing. The method may prioritize wind processing over stereo processing based on the determination that the wind sock is not attached.

FIG. 6 is a flow diagram of an example of a method 600 for detecting a blocked microphone. In this example, the image capture device may have 3 microphones. The 3 microphones may include a front microphone (e.g., channel 1 (Ch1)), a side microphone (e.g., Ch2), and a top microphone (e.g., Ch3). Example blocked states of the microphones may be defined as shown in Table 1 below, where a 0 indicates an unblocked state and a 1 indicates a blocked state.

TABLE 1

| Ch1 (Front) | Ch2 (Side) | Ch3 (Top) | Blocked Case | Output |
|---|---|---|---|---|
| 0 | 0 | 0 | 0 | Operate as normal |
| 0 | 1 | 0 | 1 | Alert user the side microphone is blocked |
| 0 | 0 | 1 | 2 | Alert user the top microphone is blocked |
| 0 | 1 | 1 | 3 | Alert user the side and top microphone are blocked |
| 1 | 0 | 0 | 4 | Alert user the front microphone is blocked |
| 1 | 0 | 1 | 5 | Alert user the front and top microphones are blocked |
| 1 | 1 | 0 | 6 | Alert user the front and side microphones are blocked |
| 1 | 1 | 1 | 7 | Alert user the front, side, and top microphones are blocked |

Referring to FIG. 6, audio signals are received 602 from at least two microphones, which may include two of the microphones 314 shown in FIG. 3. The audio signals may comprise audio blocks for a particular time interval of a longer audio stream, such as one-half second, one second, five seconds, or another duration. The audio signals are each split 604 in a plurality of different frequency sub-bands. In each frequency sub-band, a noise-floor dependent amplitude offset is applied 606. The noise floor represents, for each sub-band, a threshold amplitude level of a minimum amount of noise expected to be present in the audio signal. The respective noise floors for different sub-bands may be different. A greater amplitude offset is applied in sub-bands with higher noise floors to ensure that the signals can be reliably correlated in the following steps. In each sub-band, a sub-band correlation metric is determined 608 between the offset audio signals from the two or more microphones. The sub-band correlation metric may represent a similarity between signal levels of audio block sub-bands captured by the microphones for a given time interval. Generally, the signals will be well-correlated in the absence of wind noise or other noise having similar noise profiles in the given sub-band, but will be poorly correlated when wind noise or other noise is present in the sub-band. Thus, the correlation metric may operate as a wind detection metric. In one embodiment, each sub-band correlation metric comprises a value from 0 to 1 where a correlation metric of 1 represents a situation consistent with little to no uncorrelated noise present in the sub-band, and a correlation metric of 0 means that the captured audio may be substantially comprised of uncorrelated noise such as wind noise.

An overall correlation metric is calculated 610 for all sub-bands below a frequency threshold (e.g., below 1500 Hz). The overall correlation metric may comprise for example, an average (e.g., mean) or weighted average of the sub-band correlation metrics for sub-bands under the frequency threshold. The overall correlation metric is compared 612 to a predefined threshold. In one embodiment, the predefined threshold may dynamically change between two or more predefined thresholds depending on the previous state (e.g., whether the threshold was exceeded in the previous audio block) to include a hysteresis effect. For example, if for the previously processed block, the correlation metric exceeded the predefined threshold (e.g., a predefined threshold of 0.8 or 0.9), then the predefined threshold is set lower for the current block (e.g., 0.6 or 0.7). If for the previously processed block, the correlation metric did not exceed the predefined threshold (e.g., a predefined threshold of 0.8 or 0.9), then the predefined threshold for the current block is set higher (e.g., to 0.85 or 0.95).

If the correlation metric exceeds the predefined threshold in step 612, a determination 614 a determination is made that at least one of the one or more of the microphones is unblocked. For example, in one embodiment, a correlated audio signal processing algorithm can be used to generate a combined audio signal based on blockage conditions associated with each of the microphones (e.g., whether each microphone is blocked or unblocked). If it is determined that at least one or more of the microphones is unblocked, the method 600 returns to operation 602. In some implementations, a notification may be transmitted 618 that indicates that at least one of the one or more microphones is unblocked. If the overall correlation metric is below the threshold in step 612, a determination 616 is made that at least one of the one or more microphones 314 is blocked. In an example, the uncorrelated processing algorithm may select, for each frequency band, a frequency component of an audio signal having the lowest uncorrelated noise and combine these frequency components together to create the combined audio signal.

A notification is transmitted 618 that indicates that at least one of the one or more microphones is blocked. The notification may be transmitted during video capture or prior to video capture, such as when the user is framing the subject of the video capture. In an example, the notification may alert the user to alter their hand position and uncover the microphone, for example, using audible beeps, voice alerts, haptic alerts, or any combination thereof. In some embodiments, the method may include switching to an unblocked microphone for audio capture or applying compensation processing to the unblocked microphone to reduce the effect of the blocked microphone. In some embodiments, the detection of a blocked microphone can be used to influence other image capture device processing. For example, the image capture device may update an electronic image stabilization algorithm based on a determination that the image capture device is handheld (i.e., based on a determination that a microphone is blocked).

In some embodiments, machine learning may be used to train an algorithm to detect a blocked microphone. In some embodiments, the detection of uncorrelated audio signals in certain frequency ranges may be used to determine whether a microphone is blocked or unblocked. In some embodiments, a detection of whether a microphone is blocked or unblocked may use a speaker to play a tone and analyzing the microphone signal to detect an expected frequency response of a blocked or unblocked microphone. This may be performed during an image capture device idle state. In some examples, the tone may be outside the audible range to avoid interfering with the audio capture.

Figure 7:
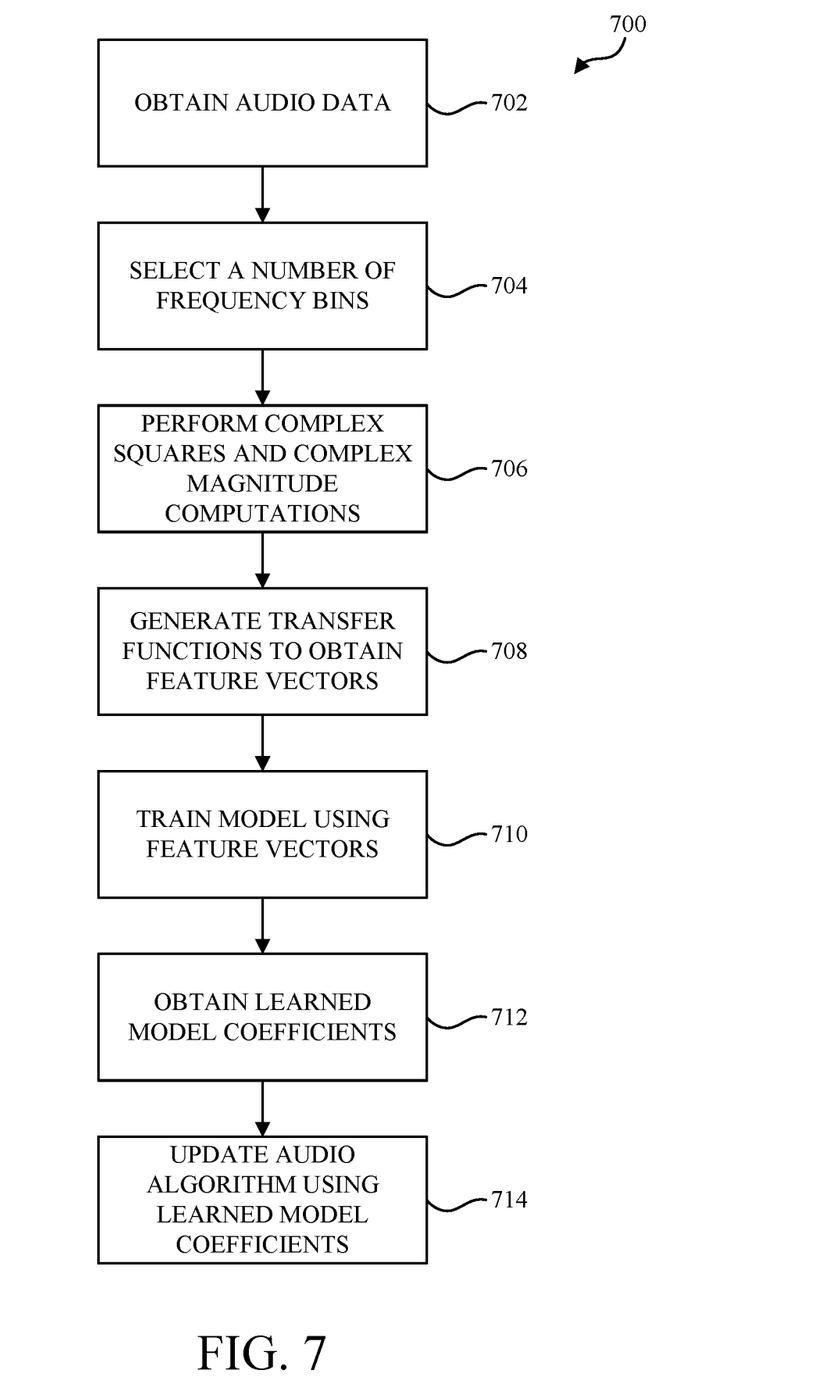
FIG. 7 is a flow diagram of another example of a method for detecting a blocked microphone.

FIG. 7 is a flow diagram of another example of a method 700 for detecting a blocked microphone. In this example, machine learning may be used to train an algorithm to detect a blocked microphone.

The method 700 includes obtaining 702 audio data. The audio data may be obtained using one or more microphones, such as the one or more microphones 314 shown in FIG. 3.

The method 700 includes selecting 704 a number of frequency bins. Each frequency bin may be a 93.75 Hz bin. The selected frequency bins may vary from 0-3000 Hz. In a 3 microphone image capture device example, 9 frequency bins may be selected, and each selected frequency bin may be different.

The method 700 includes performing 706 complex squares and complex magnitude computations for each selected frequency bin.

The method 700 includes generating 708 transfer functions to obtain feature vectors. The transfer functions may be generated by a division between the magnitude of one block and the square magnitude of another block. The transfer functions may be generated ratios of second order statistics. An example of a transfer function may be a complex multiply between channel 1 and channel 2 divided by the complex square of channel 1. For an image capture device that has 3 microphones, a feature vector may be generated by concatenating 6 transfer function estimates at 9 different frequency bins. In an example, each frequency bin may be a 93.75 Hz bin. The selected 9 bins for finger detection (e.g., blocked state detection) may vary from 0-3000 Hz. The feature vector may use the following transfer function estimates:

$$\frac{ch1 \times ch2}{(ch1)^2}; \frac{ch1 \times ch2}{(ch2)^2}; \frac{ch1 \times ch3}{(ch1)^2}; \frac{ch1 \times ch3}{(ch3)^2}; \frac{ch2 \times ch3}{(ch2)^2}; \frac{ch2 \times ch3}{(ch3)^2}$$

For training and validation, separate data sets for each covered state may be obtained. The data sets may be classified and run through the audio algorithm front end to generate the feature vectors.

The method 700 includes training 710 a model using the feature vectors. The model may be a multinomial logistic regression model. Training the model may include sampling data blocks (e.g., where each data block is approximately 5 ms) to determine whether the current blocked/unblocked state is constant for a predetermined time, such as 1 second, for example. If the current blocked/unblocked state is constant for the predetermined time, the current blocked/unblocked state is confirmed and a switch to the current blocked/unblocked state may be made. If the current blocked/unblocked state is not constant for the predetermined time, the blocked/unblocked state remains at the previous state.

The method 700 includes obtaining 712 learned model coefficients. The learned model coefficients may be derived from the determined blocked/unblocked states.

The method 700 includes updating 714 an audio algorithm using the learned model coefficients. In an implementation, the model coefficients are learned offline and then applied back to the audio algorithm. The logistic regression model uses the coefficients to compute the probability of the blocked state in real-time.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
a microphone configured to detect audio signals;
a sensor configured to detect whether a wind sock is attached to the image capture device; and
a processor configured to:
perform stereo processing of the audio signals based on a detection of an attached wind sock to obtain processed audio signals;
perform wind processing of the audio signals based on a non-detection of an attached wind sock to obtain processed audio signals; and
output the processed audio signals.

2. The image capture device of claim 1, wherein the sensor is a hall effect sensor, a switch, or a photo sensor.

3. The image capture device of claim 1, further comprising:
a detection interface that is configured to attach to the wind sock.

4. The image capture device of claim 3, wherein the detection interface is configured to attach to the wind sock magnetically.

5. The image capture device of claim 1, wherein the sensor is further configured to transmit an indication of a presence of the wind sock to the processor.

6. The image capture device of claim 1, wherein the wind sock comprises one or more magnets.

7. The image capture device of claim 1, wherein the wind sock comprises an actuator configured to activate a switch on a detection interface of the image capture device.

8. A method for wind sock detection, comprising:
detecting audio signals using one or more microphones of an image capture device;
determining whether a wind sock is attached to the image capture device based on sensor data;
prioritizing stereo processing over wind processing based on a determination that the wind sock is attached; and
prioritizing wind processing over stereo processing based on a determination that the wind sock is not attached.

9. The method of claim 8, wherein determining whether a wind sock is attached is based on sensor data.

10. The method of claim 9, wherein the sensor data includes an indication of whether the wind sock is attached to the image capture device.

11. The method of claim 9, wherein the sensor data includes data associated with a hall effect sensor, data associated with a switch, or data associated with a photo sensor.

12. The method of claim 8, further comprising:
performing stereo processing based on a determination that the wind sock is attached.

13. The method of claim 8, further comprising:
performing wind processing based on a determination that the wind sock is not attached.

14. An image capture device, comprising:
a memory;
a microphone configured to detect audio signals;
a sensor configured to detect whether a wind sock is attached to the image capture device; and
a processor configured to:
based on a detection of an attached wind sock, perform stereo processing of the audio signals and disable wind processing for a predetermined duration;
based on a non-detection of an attached wind sock, perform wind processing of the audio signals; and
output the processed audio signals.

15. The image capture device of claim 14, wherein the audio signals comprise audio blocks for a time interval of an audio stream.

16. The image capture device of claim 15, wherein a threshold amplitude level of a minimum amount of noise is present in the audio signals.

17. The image capture device of claim 14, wherein the processor is further configured to:
generate a user notification that indicates a change in audio processing mode based on detection or removal of the wind sock.

18. The image capture device of claim 17, wherein the processor is further configured to:
store, in the memory, an indication of whether the wind sock was attached during audio capture; and
associate the indication with corresponding audio data.

19. The image capture device of claim 14, wherein the sensor is configured to detect a magnetic field generated by a magnet embedded in the wind sock.

20. The image capture device of claim 14, wherein the processor is further configured to:
adjust a sensitivity parameter of the stereo processing based on a type of wind sock detected.

* * * * *